Oct. 11, 1960 J. E. COLLINS 2,955,617
PLUNGER VALVE WITH TWO SOLENOID-ACTUATED PILOT VALVES
Filed Nov. 9, 1955 2 Sheets-Sheet 1

INVENTOR.
JOHN E. COLLINS
BY
Bates, Teare & McBean
Attys.

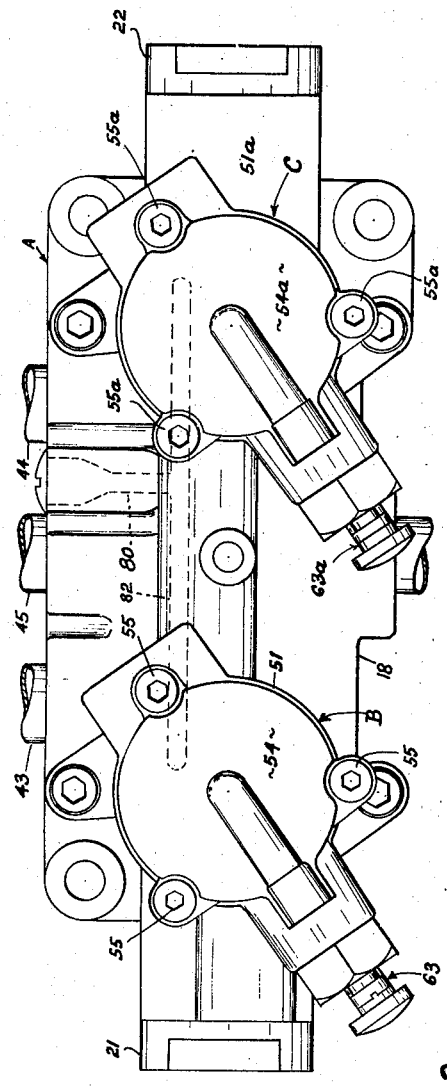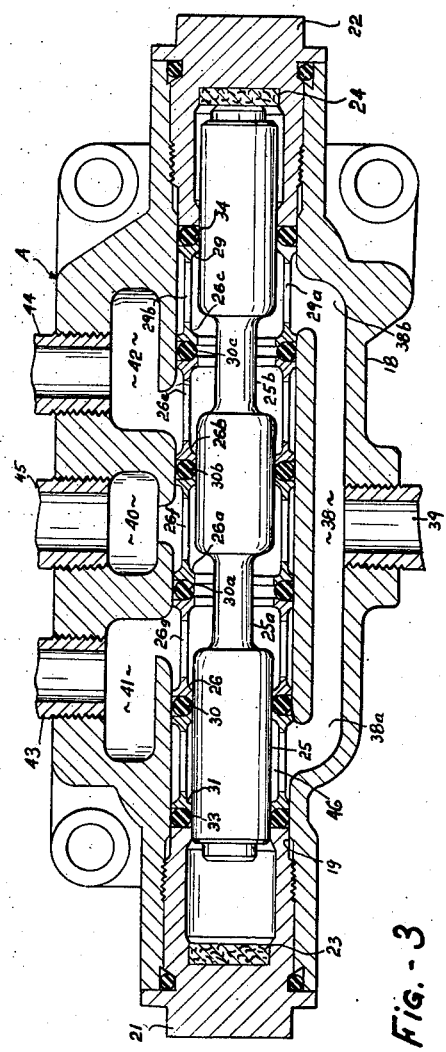

United States Patent Office 2,955,617
Patented Oct. 11, 1960

2,955,617

PLUNGER VALVE WITH TWO SOLENOID-ACTUATED PILOT VALVES

John E. Collins, Akron, Ohio, assignor, by mesne assignments, to International Basic Economy Corporation, New York, N.Y., a corporation of New York Filed Nov. 9, 1955, Ser. No. 545,856

5 Claims. (Cl. 137—623)

This invention relates to valves and more particularly to valves which are used for controlling the flow of fluid in gaseous or liquid systems.

One type of control valve heretofore used has a plunger that is displaceable in response to a pressurized fluid acting on one or both sides of the plunger head, and is triggered by a single solenoid operated pilot control member. In this type of valve, the pressurized fluid is always maintained on one side of the plunger head. To effect displacement, the same pressurized fluid is also introduced to the other side of the plunger head, the displacement being effected by the difference in cross-sectional area of the two sides of the head. In a valve of this type, exact control of the position of the plunger is sometimes difficult to secure, particularly when the fluid pressure is low. In addition, as the compression ring on the plunger head becomes worn, the pressurized fluid may leak from one side of the head to the other and cause further loss of control over the plunger. As a result, operation of the valve is often undependable and highly inflexible.

An object of the invention is to provide a plunger control valve which affords complete flexibility of operation and dependable control of the operative positions of the plunger.

Another object of the invention is to provide a plunger valve which is efficient and durable.

Briefly, the foregoing objects are accomplished by the provision of a plunger valve having a double-headed, displaceable plunger actuated by exhaust of pressurized fluid alternately from one end of the plunger while maintaining fluid pressure force against the opposite end so that the plunger moves toward the end region which is then exhausted. Positive control of the plunger is secured by providing a pair of solenoid operated pilot control valves for triggering the plunger valve. In this arrangement, one of the solenoid valves may be energized to exhaust fluid from adjacent one of the plunger heads while the other solenoid valve is de-energized to communicate pressurized fluid to the other plunger head. This structure ensures pressurized fluid at either end of the plunger at all times to positively position the same.

Other objects and advantages of the invention will be apparent from the following description taken in conjunction with the drawings in which:

Fig. 2 is a top plan view of the plunger valve and solenoid control arrangement shown in Fig. 1.

Fig. 3 is a horizontal sectional view taken along line 3—3 of Fig. 1, and

Figure 4:
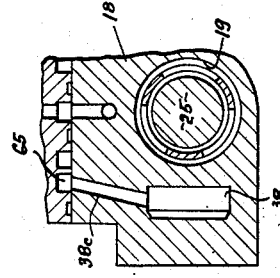
Fig. 4 is a fragmentary sectional view taken along line 4—4 of Fig. 1.

Referring to the drawings, there is shown a plunger valve having a dual, solenoid-operated pilot control assembly in accordance with the invention and comprising a plunger valve A and a pair of solenoid operated pilot control members B and C which have complementary meeting faces on the parting line D. The plunger valve comprises a body 18, having a longitudinal cylindrical bore 19 closed at its opposed ends by screw caps 21 and 22. The inner faces of the screw caps carry shock pads 23 and 24 respectively.

Within the bore 19 there is a reciprocatable plunger 25 necked down at two locations 25a and 25b, the purpose of this reduction in diameter being to permit cross communication between certain body ports, as will appear. The plunger "floats" within suitable spacing and packing members comprising, in the present instance, a series of spacer rings 26, 26a, 26b, 26c, and intermediate packing rings 30, 30a, 30b and 30c respectively. At the opposed outer ends of the spacer assembly there are packing rings 33 and 34, ring 33 being disposed between spacer 31 and cap 21, and ring 34 being disposed between spacer 29 and cap 22. The packer-spacer assembly so far described is fixed in position, and the plunger 25 is freely movable therewithin.

The spacers are provided with peripherally disposed apertures (shown for example at 26e, 26f, 26g, 29a and 29b) which permit free passage of pressurized fluid (liquid or gaseous) in cross connection between predetermined ports, as permitted by the cyclic plunger positions.

Situated at an intermediate point on valve body 20 is an inlet port 38, which receives pressurized fluid from a pipe 39, and transmits it through branch passages or arms 38a, 38b (Fig.3) and 38c (Fig. 4), to opposed ends of the body bore.

On the opposite side of the body there is a centrally disposed exhaust port 40, situated between two cylinder feed ports 41 and 42, which, through respective pipes 43 and 44 serve two working cylinders, or two ends of a double-acting cylinder (not shown).

Figure 1:
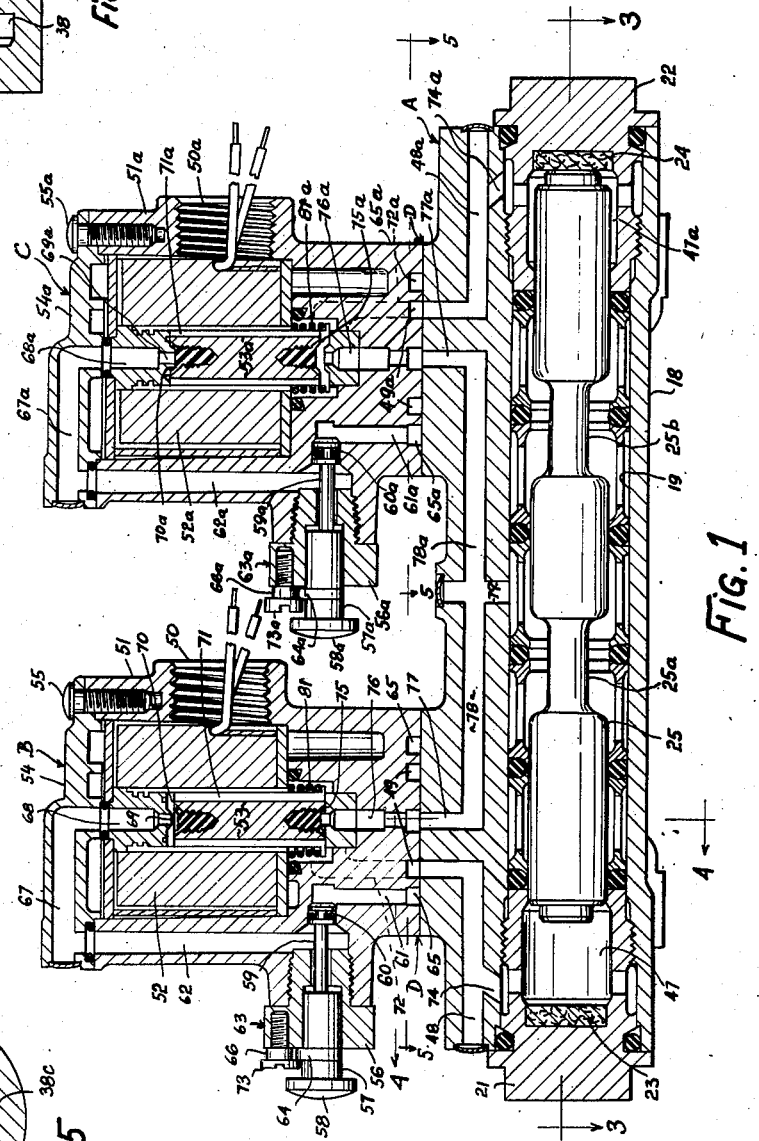
Fig. 1 is a vertcial section view through a plunger valve and dual solenoid operated pilot control valve arrangement in accordance with the invention.

When the plunger is in the position shown in Figs. 1 and 3, pressurized fluid may pass from port 38 through passage 38b, then through spacer aperture 29a and around the necked portion 25b of the plunger, and through aperture 26e into port 42 and pipe 44 to a power cylinder. At the same time, the other cylinder, or the other end of the double-acting cylinder, is open to exhaust through pipe 43, port 41, aperture 26g, past the necked portion 25a, through the aperture 26f, into port 40, and out exhaust pipe 45. Arm 38a feeds pressurized fluid to bore portion 46, but this fluid cannot pass to the left or right by reason of spacer members 31 and 26.

When the plunger moves to the left end of the bore, pipe 44 will be opened to exhaust and pipe 43 will receive pressure fluid from pipe 39 past necked portion 25a.

The reciprocation of the plunger is controlled by the two solenoid-operated pilot control valves B and C, the operation of which will now be described. Since the two valves are identical, I have identified the parts of valve B by numbers only and the corresponding parts of valve C by the same numbers as used with valve B, but followed by a suffix "a." The valve B (Fig. 1), comprises a body or housing 51 in which is fixed a solenoid coil 52, which is in accessible communication with a junction box portion 50 of the body. Within the solenoid coil an armature 53 is vertically reciprocable, responsive, of course, to energization and de-energization of the solenoid coil 52 by any suitable timer device. A cap 54 is retained on top of the housing by cap screws 55. Disposed in the side of valve housing 51 is a manual override valve 63 having a body 56 and a control plunger or valve 57 operated by a button 58. The plunger tapers into a stem 59 which carries a valve head 60. The valve is shown in seated position blocking fluid flow between passages 61 and 62. Passage 61 communicates with an annular passage 65 (Fig. 5), which in turn is in communication through passage 38c with the inlet port 38 (Fig. 4). By rotating valve 57, a cut-away portion of its flange 64 can pass the head 73 of a stud 66 fixed in the body 56, so that the override valve can be drawn to the left (Fig. 1) opening the valve.

Assuming the valve to be open, and plunger 25 to be at the right end of its bore as shown, fluid pressure flows from annular passage 65 through passage 61, past open valve head 60, through passages 62, 67, 68, and 69, past open valve head 70 (this valve being open because armature 53 is in its bottom position) through slots 71 on the armature sides, through a passage 72 in the body 51, and then through passages 49, 48, and 74 to the chamber 47 at the end of the valve body forcing the plunger 25 to the right as shown.

When the armature 53 is raised by the next energization of coil 52, valve head 70 at the upper end of the armature is closed, terminating fluid flow thereby. At the same time, valve 75 of the lower end of the armature is opened and the pressurized fluid in chamber 47 can exhaust through passages 74, 48, 49 and 72, past valve 75 and through passages 76, 77, 78 and 79 and through aperture 26f to exhaust port 40. Also at the same time, valve C is de-energized thus lowering armature 53a which permits the pressurized fluid to flow into chamber 47a in the same manner as described above in connection with valve B, the plunger now being forced to the left. Reciprocation of the plunger 25 is thus responsive to energization and de-energization of valves B and C alternately, with valve B independently controlling the flow of pressurized fluid to and from chamber 47 and valve C independently controlling the flow of pressurized fluid to and from chamber 47a.

Normally the override valve 63 is open. If the electric current is cut off unexpectedly, or if it is desired to manually control just a few cycles of operation, for instance in setting up and checking an assembly, the override valve is opened, on valve B for example, and pressurized fluid is admitted to chamber 47 as previously described, because armature 53 remains in its lower or de-energized position. The plunger 25 is now forced to the right. At the same time, of course, the override valve 63a on valve C is manually closed, thus cutting off the flow of pressurized fluid to chamber 47a. The pressurized fluid in chamber 47a may now flow back through passages 74a and 72a, lift the armature against the force of spring 81a and then flow through passages 76a, 77a, 78a and 79 to exhaust port 40. The plunger 25 may be moved to the left by reversing the above procedure, namely by opening override valve 63a and closing the override valve 63. This cyclic procedure may be repeated as often as desired.

Figure 5:
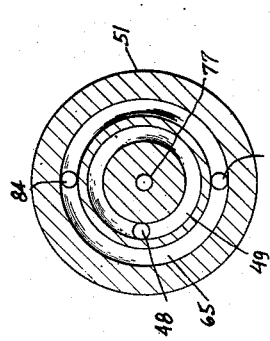
Fig. 5 is a horizontal sectional view taken along the line 5—5 of Fig. 1.

Normally, each of the solenoid valves B and C receives pressurized fluid from inlet port 38 as previously explained. However, if for some reason it is desired to secure pressurized fluid for the solenoid valves from some other source, as for example if the pressure from port 38 should drop considerably, the passages 38c leading to each of the valves B and C could be plugged by any suitable means and a pressurized fluid from an external source could then be brought in through external inlet 80 (Fig. 2). From inlet 80, the fluid flows through passage 82, which is in direct communication with annular passage 65 of solenoid valve B through passage 84 (Fig. 5). The passage 82 is also in direct communication with annular passage 65a of solenoid valve C for supplying the externally supplied pressurized fluid thereto.

In operation, the plunger 25 strikes the shock pads 23 and 24 alternately, which, reduces the shock and noise of valve operation. The rate of cyclic reversal is governed by the rate of current interruptions alternately to the solenoid valves B and C.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

I claim:
1. Valve mechanism comprising a valve housing having an axially slidable valve plunger therein, a pair of opposed fluid pressure chambers in said housing in which the corresponding opposed ends of the plunger are respectively disposed in sealed sliding engagement, each said chamber including stop means against which a portion of the plunger end in such chamber is engageable to arrest movement of the plunger, and a pair of solenoid-actuated fluid control valves, one associated with one of said chambers and the other associated with the other chamber, each control valve having a de-energized position in which said valve communicates its respective chamber with a fluid pressure source and having an energized position in which its respective chamber is communicated to exhaust, said solenoid valves cooperating when both are in said de-energized position for maintaining both said chambers under fluid pressure from the pressure source whereby said valve plunger is held stationary with one end against the stop means of its respective chamber by the force of fluid acting on the opposing plunger end, and said solenoid valves being alternately energizeable to exhaust fluid selectively from one of said chambers so that the fluid pressure in the other chamber urges said valve plunger toward the exhausted chamber.

2. Mechanism according to claim 1 and further comprising in said main valve housing a longitudinal bore extending between said chambers, fluid flow openings into said bore, a series of axially spaced annular packing members peripherally engaging said bore at locations between said openings and adjacent said chambers, and said valve plunger being slidable axially in said bore in sealing engagement with said packing members and having means thereon for selectively directing fluid flow between one or more of said flow openings.

3. Mechanism according to claim 1 wherein each said opposing end portion of said valve plunger is engageable with its respective stop means to expose an end area thereof to fluid pressure in its respective chamber which area is smaller than the opposing end area of the plunger exposed to equal fluid pressure in the opposite chamber.

4. Valve mechanism comprising a main valve housing having an axially slidable main valve plunger therein; a closed fluid pressure chamber in said housing at each end of the bore in which the corresponding ends of the plunger are respectively disposed in sealed sliding engagement; each chamber including stop means against which a portion of the plunger end in such chamber is engageable to arrest movement of the plunger; and a pair of solenoid-actuated fluid control pilot valves one associated with one of said chambers and the other associated with the other chamber, each said pilot valve having: a plunger, a flow passage axial of the plunger and communicating with the respective chamber with which the valve is associated, a first port in said axial passage adjacent one end of the plunger for communicating a fluid pressure source with said axial passage, a second port in said axial passage adjacent the opposite end of the plunger and communicating said axial passage with exhaust, an electro magnetic coil disposed when energized to displace said plunger to a position to close said first port and thereby communicate the respective chamber with exhaust through the then open second port, and means biasing said plunger toward said second port to close said second port when said coil is de-energized to thereby communicate the respective chamber with said pressure source through the then open first port; said solenoid pilot valves cooperating when both their respective coils are de-energized for maintaining both said chambers under fluid pressure from the pressure source whereby said main valve plunger is held stationary with one end against the stop means of its respective chamber by the force of fluid acting on the opposing end thereof, and the coils of said pilot valves being alternately energizable to exhaust fluid selectively from one of said chambers so that the fluid pressure in the other chamber urges said main valve plunger toward the exhausted chamber.

5. Valve mechanism comprising a valve housing having an axially slidable valve plunger therein, the valve plunger having a pair of opposed actuating pressure faces and being responsive to differential fluid pressure force acting on said faces to displace said valve plunger, each said actuating face defining with adjoining closed regions of the housing a fluid pressure chamber to contain fluid to which the respective face is exposed, stop means in each chamber against which the plunger face in such chamber is engageable to arrest movement of the plunger, and a pair of solenoid-actuated fluid control valves one control valve being associated with the fluid chamber adjacent one said plunger face and the other control valve being associated with the fluid chamber adjacent the opposing plunger face, each control valve having a de-energized position in which said valve communicates its respective chamber with a fluid pressure source and having further an energized position in which its respective chamber is communicated to exhaust, said solenoid valves cooperating when both are in said de-energized position for maintaining both said chambers under fluid pressure whereby said valve plunger is held stationary with one pressure face thereof against the stop means of its respective chamber by the force of fluid acting on the opposing pressure face of the plunger, and said solenoid valves being alternately energizable to exhaust fluid selectively from one of said chambers so that the force of the fluid pressure acting on the opposing pressure face in the other chamber urges said plunger valve toward the exhausted chamber.

References Cited in the file of this patent

UNITED STATES PATENTS

| | | |
|---|---|---|
| 2,409,517 | Schmit | Oct. 15, 1946 |
| 2,615,079 | Miller | July 29, 1952 |
| 2,616,449 | Maha | Nov. 4, 1952 |
| 2,617,444 | Gardner | Nov. 11, 1952 |
| 2,661,182 | Kipp | Dec. 1, 1953 |
| 2,745,429 | Crookston | May 15, 1956 |
| 2,758,447 | Prusek | Aug. 14, 1956 |
| 2,775,982 | Canfield | Jan. 1, 1957 |
| 2,821,997 | Clay | Feb. 4, 1958 |
| 2,836,196 | Gunn | May 27, 1958 |
| 2,853,976 | Gerwig | Sept. 30, 1958 |
| 2,859,735 | DiTirro et al. | Nov. 11, 1958 |
| 2,861,592 | Collins | Nov. 25, 1958 |
| 2,861,594 | Collins | Nov. 25, 1958 |